July 2, 1963 T. P. PAJAK 3,096,053
LOW DENSITY CONSTRUCTION MATERIAL
Filed Nov. 17, 1960 4 Sheets-Sheet 1
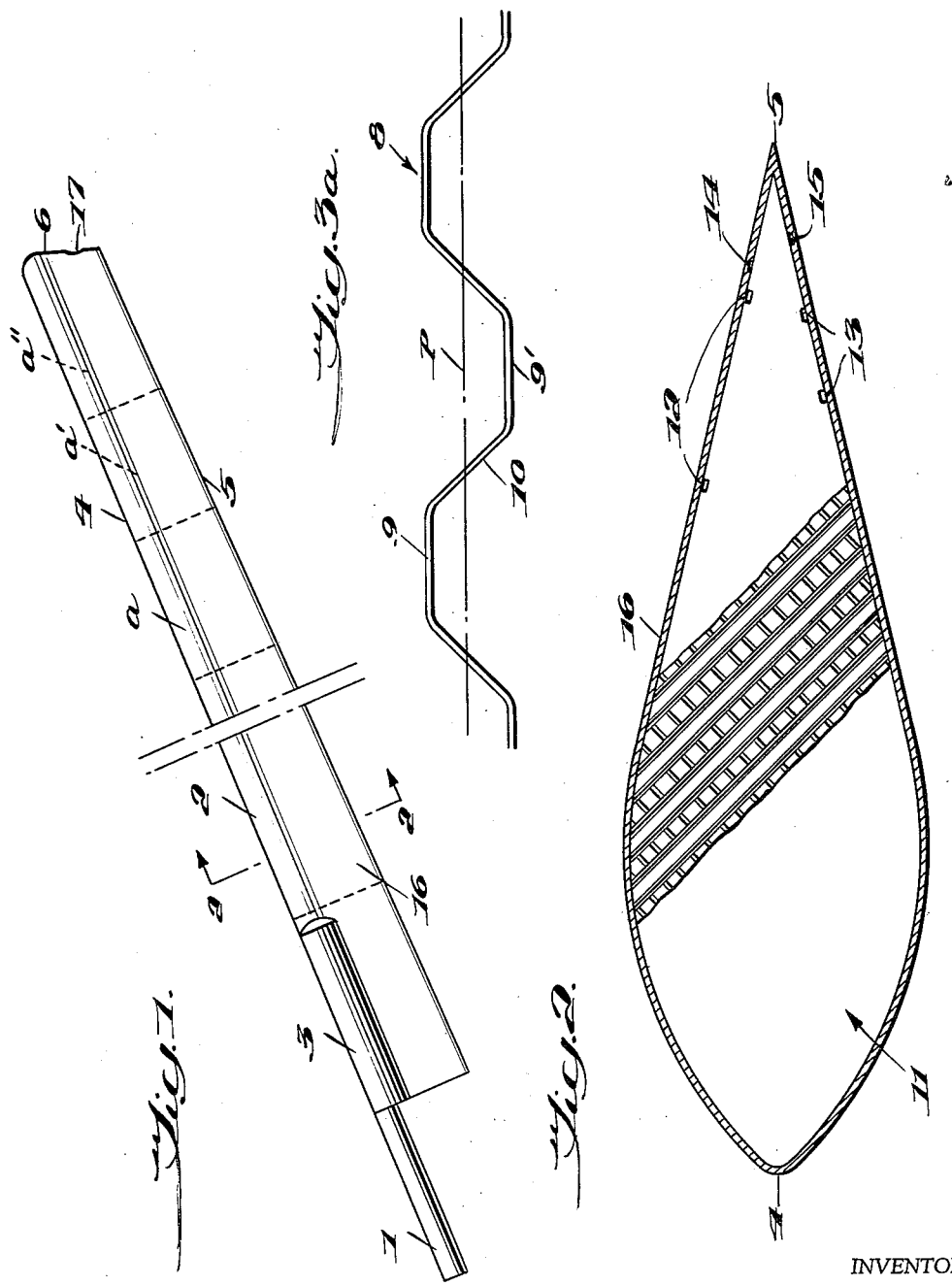
INVENTOR
THEODORE P. PAJAK
BY
ATTORNEYS

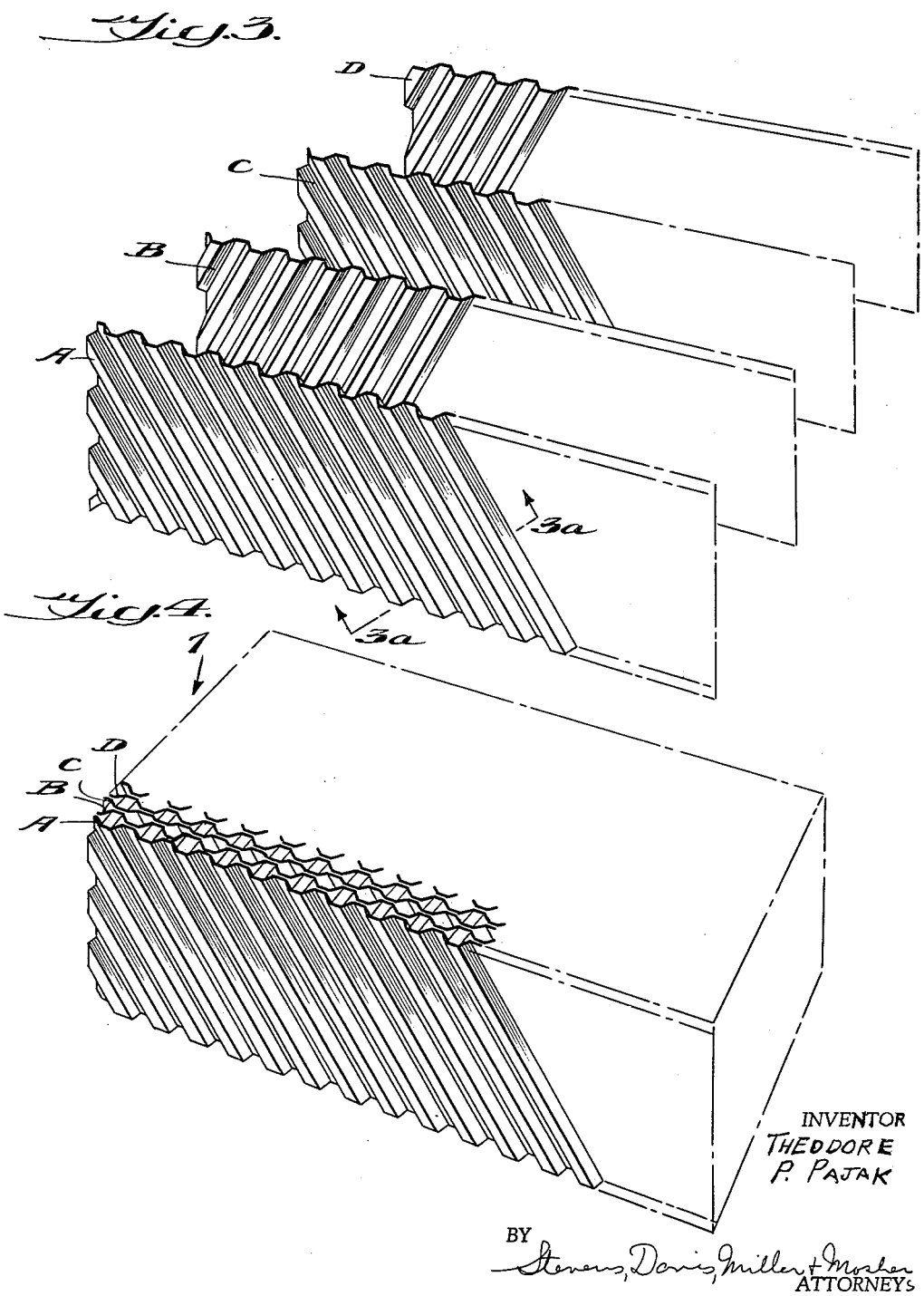

July 2, 1963 T. P. PAJAK 3,096,053
LOW DENSITY CONSTRUCTION MATERIAL
Filed Nov. 17, 1960 4 Sheets-Sheet 3

INVENTOR
THEODORE P. PAJAK
BY Stevens, Davis, Miller + Mosher
ATTORNEYs

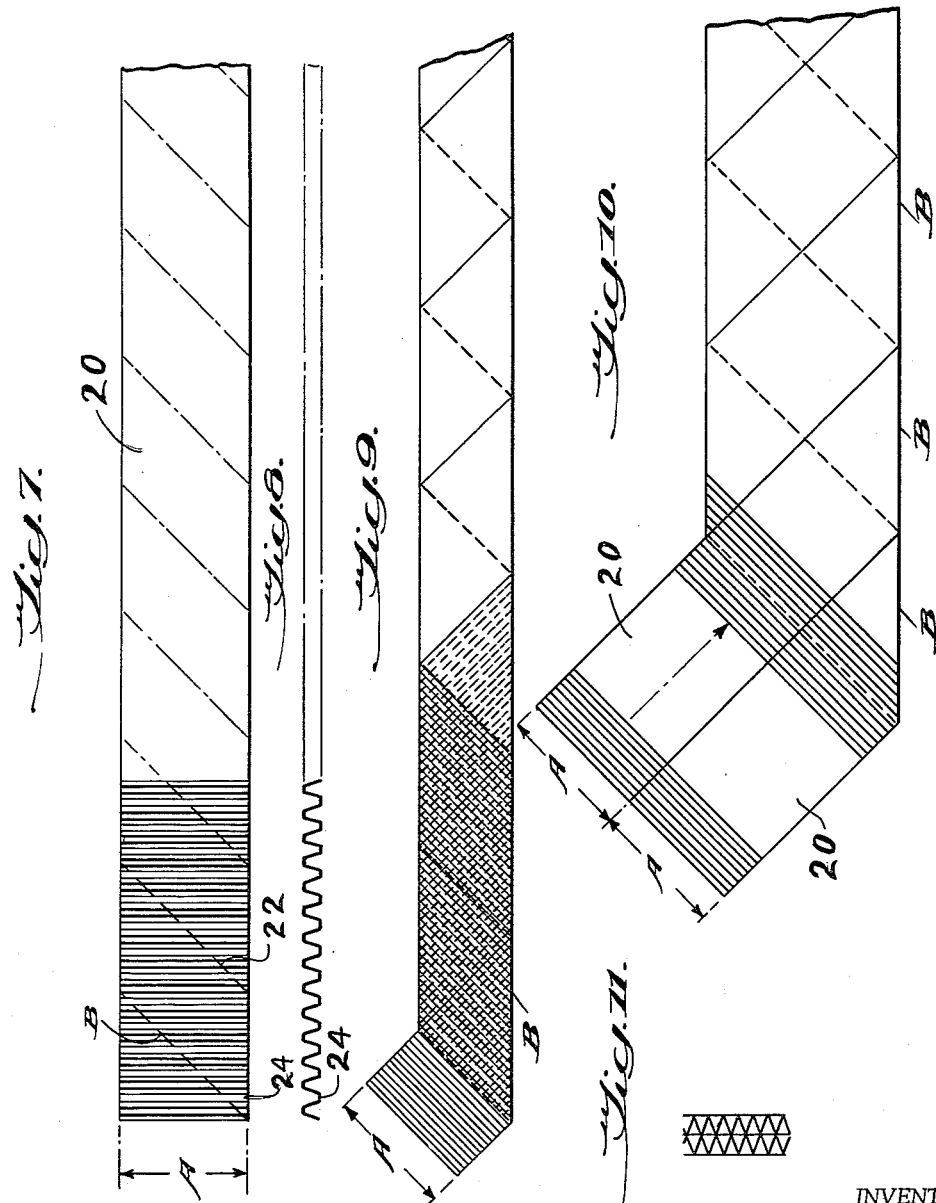

United States Patent Office 3,096,053
Patented July 2, 1963

3,096,053
LOW DENSITY CONSTRUCTION MATERIAL
Theodore P. Pajak, Belair, Md., assignor to General Grid Corporation, Army Chemical Center, Md., a corporation of Maryland
Filed Nov. 17, 1960, Ser. No. 69,888
17 Claims. (Cl. 244—133)

This invention relates to a low density, lightweight construction material particularly suited for aircraft structures. The novel properties of this material make it particularly suited for airfoil construction including rotor blades. The material affords a structure particularly suited to the spanwise component units of airfoils or rotor blades, and the method of making the same, wherein each unit is of a rigid and naturally vented, corrugated metal foil construction that is of light weight, but of unusually high strength, and wherein the units are capable of being adhesively bonded together in end-to-end relationship to form the entire rotor blade.

Heretofore in the fabrication of metallic cellular panels, particularly for aircraft use, in which surface sheets are placed on and bonded to the outer surfaces of a cellular core by means of a thermosetting bonding adhesive, special provision has had to be made for the escape of the vaporized solvents liberated during the bonding process, in order to attain maximum bonding strength. Moreover, in order to profile, machine or otherwise shape the prefabricated core blocks to the final airfoil shape desired, special cell wall stabilizing steps had to be introduced to prevent crushing or otherwise deforming the laminations within the core block during such shaping processes, to avoid serious loss of structural strength in the finished airfoil core unit. The present invention not only overcomes both of these problems by avoiding the need for such special processing steps, by reason of the particular arrangement of the core components within the core block or unit, but it also provides a laminated core unit having three-dimensional stability and unexpected and unusually high-resistant lateral crushing strength.

It is among the objects of the present invention to provide a lightweight, unusually high strength, rotor blade comprised of laminated corrugated sheets of metal foil, wherein the corrugations are parallel to each other and are generally of flat ridged, slightly sloping side section, the laminations being bonded together in face-to-face relation with the corrugations of adjacent sheets oppositely inclined to each other in a substantially 90° angular relationship.

Another object is to provide a laminated airfoil construction of linearly corrugated sheets of metal foil wherein the sheets are bonded face to face with corrugations of adjacent sheets oppositely inclined at approximately ninety degrees to each other and bonded together with a thermosetting or other suitable adhesive, the crossed corrugations of adjacent sheets forming an X-truss construction that is self-venting.

Another object is to provide a rotor blade of linear corrugated metal foil sheets bonded together in face-to-face, parallel relationship with the corrugations of adjacent sheets bonded together and oppositely inclined in angular relationship, with the parallel planes of each corrugated sheet extending at any desired angle within the skin of the rotor blade between the limits of zero to ninety degrees with respect to the longitudinal or spanwise axis of the rotor blade.

Another object is to disclose a method of making exceptionally high strength laminated airfoil core units of corrugated metal foil sheets bonded together, that can be profiled without using cell wall stabilization steps during fabrication.

Another object is to disclose a method of making an exceptionally high strength laminated construction of corrugated sheets of metal foil or like material that is self-venting.

Other objects and advantages of this invention will become apparent from the following description when taken in conjunction with the accompanying drawings, which illustrate one application only and in which FIGURE 1 shows in plan a conventionally shaped helicopter rotor blade;

FIGURE 2 is a transverse cross-sectional view of the blade taken on line 2—2 of FIGURE 1;

FIGURE 3 shows the relative positioning of the component metal foil corrugated sheets in the construction of the rotor blade core unit;

FIGURE 3a is a sectional view taken on line 3a—3a in FIGURE 3;

FIGURE 4 shows a laminated panel structure with the metal foil corrugations adhesively bonded together;

FIGURE 7 shows a strip of material in the first stage of carrying out the method of making core material hereinafter described;

FIGURE 8 shows an edge view of the strip shown in FIGURE 7;

FIGURE 9 shows the folding steps of the strip shown in FIGURE 7;

FIGURE 10 shows the folding of two strips edge to edge for greater width of core material.

FIGURE 11 shows the folded strip of FIGURE 9 viewed from the right hand end.

Figure 5:
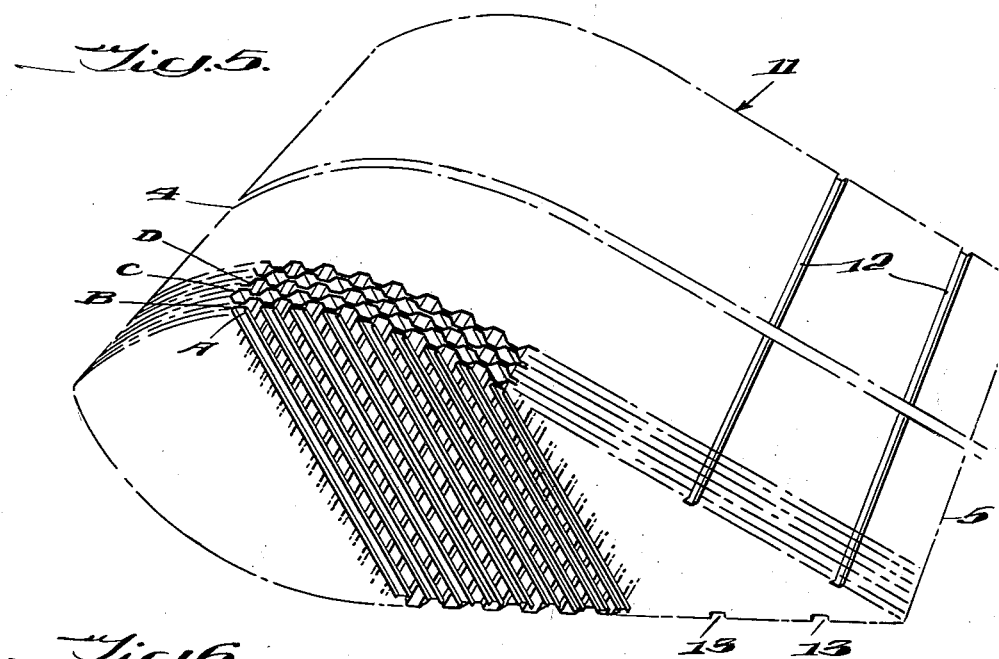
FIGURE 5 shows a blade core unit after being profiled to shape with the metal foil laminations disposed chordwise or normal to the longitudinal axis of the blade unit.

FIGURE 1 shows a helicopter rotor blade of any conventional design having shaft 1 fastened to the blade 2 in any suitable manner at 3, the leading edge, trailing edge and blade tip being designated, respectively, at 4, 5 and 6. Shaft 1 is adapted to be mounted in any suitable manner in a rotor hub (not shown) for rotation to provide an aerodynamic lifting effect.

The rotor blade 2 is composed of a series of spanwise attached, core sections a, a', a'', etc., which are bonded together in end-to-end relation, preferably by means of a thermosetting adhesive suitable for bonding metal surfaces. Each core section may be machined or profiled to the desired airfoil shape either before or after it is assembled with other sections to form the rotor blade core structure.

Each core section panel unit 7 is formed from a plurality of flat, corrugated metal foil sheets, A, B, C, D, etc., that are disposed in face-to-face abutting relation and composed of aluminum, or other like material, preferably having a thickness ranging from .001 to .006 of an inch. The corrugations 8 of each sheet, which may be formed by stamping or in any other suitable manner, extend linearly and parallel to each other and are of uniform shape and size throughout. The corrugations are formed with corresponding flat ridge areas 9 and 9' at opposite sides of the medial plane P of the sheet, as shown in FIGURE 3a, the side 10 of each corrugation 8 being slightly inclined outwardly from each ridge area, and extend through the medial plane P to form similarly inclined sides of the immediately next oppositely facing flat ridge areas 9. Corrugations having a foil thickness of .002 of an inch and a height of 3/32 of an inch on 5/16 of an inch centers, have proved very satisfactory for general use. However, other sizes ranging in height from 1/16 to 3/16 of an inch and 3/8 to 1/2 of an inch on center have also proved satisfactory in other constructions. Hence, the foil thickness, size and spacing of the corrugations can be varied in conformity with the dictates of engineering design.

Each flat, corrugated metal foil sheet is cut to a desired rectangular size that provides minimum wastage for a given airfoil blade size, with the corrugations extending angularly, preferably at substantially forty-five degrees, to its sides. The sheets are then assembled in face-to-face relation with the inclinations of the corrugations of alternate sheets reversed to extend oppositely, as shown in FIGURE 3, so that the corrugations of adjacent sheets lie normal to each other at an angle of substantially ninety degrees. A sufficient number of sheets are thus assembled to form a unit of desired size with the ridge areas of all corrugations coated with a suitable thermosetting adhesive. The sheets are then bonded together by the application of heat and pressure. During the bonding stage, the linear channels, formed by the corrugations that extend from one side to the other of the core panel, form venting passages that provide easy escape to the atmosphere of the volatilized solvents given off by the adhesive, a feature that is extremely important in the attainment of maximum bonding strength. It is to be noted that the oppositely inclined side walls 10 of the corrugations, when the corrugations are bonded together, not only greatly contribute to the three-dimensional stability of the whole panel, but also they further provide it with an exceptionally high crush-resisting strength.

To further minimize wastage in a continuous process of manufacture, the method illustrated in FIGURES 7 to 11 may be employed. A continuous strip 20 is corrugated at 24 as shown in FIGURE 8. The corrugations are slit in any suitable manner such as by parallel saw cuts 22 spaced apart the width of the strip and inclined substantially forty-five degrees, which do not extend through the bottom sheet of the corrugation 24. Strip 20 is then folded on fold lines B whereby the fold lines B occur adjacent each other on both sides of the folded strip if the strip is of a length to be repeatedly folded, so that the adjacent side edges of the strip will abut each other to form a continuous structure as illustrated in FIGURES 9 and 11 to make a panel slightly narrower than the width of strip A but of a thickness equal to twice the depth of the corrugations. The strip of FIGURE 9 can then be cut into blocks from which larger blocks can be formed by stacking and bonding.

It should be pointed out that strip 20 should be first corrugated in any conventional manner; then the crests of the corrugations coated with adhesive by roller coating, which roller is synchronized with the speed of corrugation so that only the crests are coated and no adhesive runs down the sides of the corrugations. The slitting or cutting of the corrugations is then performed in any suitable manner, after which the strip is folded and reversely stacked with other corresponding strips and bonded to form large blocks.

In FIGURE 10 is illustrated a method of achieving double width elements which can be similarly folded, stacked and bonded to form thicker blocks. This is done by placing two strips side by side and folding them simultaneously.

After the bonding adhesive has completely cured, the panel 7 is then ready for machining or profiling into the desired rotor blade shape. By reason of the angularly opposed relationship of adjacent sheet corrugations, their particular shape in cross-section, as previously referred to, and the fact that they are rigidly bonded together at all points along their length where they cross each other, the panel unit, in effect consists throughout of a multiplicity of interconnected truss components of X-formation achieving a truss-grid construction material. This construction provides superior machining characteristics to the panel by reason of its inherent rigidity and and stiffness, whereby profiling can be effected in any desired manner. It can be milled, sanded, sawed, etc., and in any desired directions, either through the body of the panel or along any of its surfaces without causing deformation thereof.

The panel 7 is now profiled to the shape desired, as indicated in FIGURES 2 and 5. In the embodiment shown in those figures, the rotor blade core section 11 is so machined that the parallel planes of the bonded metal foil sheets A, B, C, etc., are disposed vertically and chordwise or normal to its leading edge 4, the leading edge of the blade core section or unit being parallel to its spanwise axis. One or more small, spanwise grooves 12, 13 may be provided in the upper or lower surfaces of the unit, or in both of these surfaces, if desired, to provide spanwise venting after the metal skin 16 is formed around and thermo-adhesively bonded to the core unit. If preferred, one or more shallow, spanwise venting grooves 14, 15 may be provided in the inner surfaces of skin 16, in addition to or in lieu of core surface grooves 12, 13.

Figure 6:
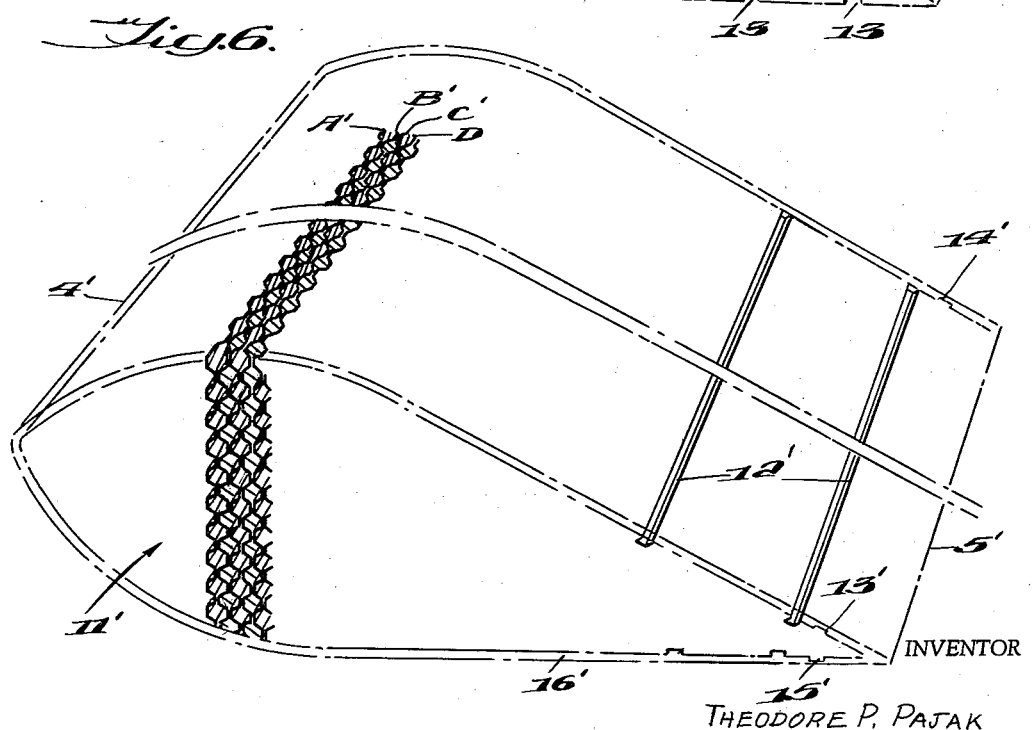
FIGURE 6 shows a blade core unit similar to FIGURE 5, but with the metal foil laminations disposed parallel to its longitudinal or spanwise axis.

The modified arrangement shown in FIGURE 6 corresponds to the embodiment of FIGURE 5 except that in this embodiment, the bonded blade core section 11' is so machined that the vertical parallel planes of the corrugated sheets of metal foil A', B', C', D', etc., are disposed vertically and parallel to the spanwise axis of the blade section. Features in this embodiment corresponding in detail to features described with respect to FIGURE 5 are all designated by corresponding primed numerals.

It is to be understood that while this disclosure contemplates that the planes of the flat, corrugated metal foil sheets within the rotor blade section may be at any desired angle to the spanwise axis of the blade section, that is, they may be positioned at any desired angle between the chordwise and spanwise positions shown in FIGURES 5 and 6, the longitudinal axes of all the corrugations of all the metal foil sheets will be maintained at substantially forty-five degrees to the chordal plane and/or leading edge of the rotor blade section.

With respect to either of the two arrangements shown in FIGURES 5 and 6, it is intended that the corrugations of the rotor blade core sections, corresponding to blade sections a, a', a'', etc., in FIGURE 1, are disposed in the manner shown in FIGURES 5 and 6 and that these blade core sections are bonded in a spanwise end-to-end relation to form the entire rotor blade. The blade core sections may first be securely bonded together and then the metal skin of the entire blade, as an integral piece, may be shaped and bonded onto the spanwise-joined blade core section.

When the rotor blade is in its completed form, as indicated in FIGURE 1, the spanwise venting grooves 12–15 of the various blade sections will be in alignment with each other and connect with a vent opening 17 at the blade tip 6, so as to subject the venting of the blade to the atmosphere to the action of centrifugal force when the blade is mounted for rotation. Since the rotor blade interior is connected throughout by the venting passages, as explained, the atmospheric pressures within the rotor blade are automatically maintained equalized at all times. This eliminates the internal vacuum usually created in sandwich assemblies during the descent of an aircraft in which the rotor blade is mounted, thus avoiding the formation of moisture condensation within the rotor blade and the possibility of its freezing with its obvious attendant disadvantages of increased weight, centrifugal forces, etc.

In certain applications it may be desirable to use other thin sheet materials or foil in which case the method of manufacture and fabrication will be generally the same as for the metal foil herein described.

It will be obvious to those skilled in the art that various changes may be made in the invention without departing from the spirit or the scope thereof since the invention may be practiced in some instances with materials such as plastic, resin impregnated Fiberglas cloth, resin impregnated paper and some other metals. Therefore the invention is not to be construed as limited to that, which by way of example, is shown on the drawings or in the specification, but only indicated by the appended claims.

What is claimed is:

1. A laminated, lightweight airfoil core having a leading edge and a trailing edge comprising, a plurality of linearly corrugated flat sheets of metal foil adhesively bonded together at all contacting surfaces in face-to-face relation, the corrugations of alternate sheets being angularly inclined and opposed to cross those of adjacent sheets, whereby said crossed corrugations form rigid truss-like structures, the longitudinal axes of all the linear corrugations of said plurality of flat sheets being disposed obliquely to said leading edge.

2. A laminated, lightweight airfoil core having a leading edge and a trailing edge comprising, a plurality of linearly corrugated flat sheets of metal foil securely bonded together in face-to-face relation at all points of contact therebetween, the corrugations of adjacent sheets being of substantially the same size and disposed in oppositely inclined position with respect to each other, said corrugations of each sheet forming alternately oppositely-facing venting channels throughout their respective lengths, the longitudinal axes of all the linear corrugations of said plurality of flat sheets being disposed obliquely to said leading edge.

3. A laminated, lightweight airfoil core as defined in claim 2, wherein said corrugations of each sheet each comprise a flat ridge portion, said flat ridge portion having flat supporting side walls that incline outwardly therefrom to provide lateral stability, said airfoil core having spanwise venting groove means formed in an outer surface thereof intermediate said leading and trailing edges.

4. A lightweight helicopter rotor blade of airfoil shape having an outer end, said blade including a core comprised of a plurality of linearly corrugated flat sheets of metal foil disposed in face-to-face contacting relationship with each other, the linear corrugations of adjacent sheets being oppositely inclined whereby to extend in crossing relationship with each other, the corrugations of said adjacent sheets being rigidly bonded together at all points where they cross each other, a metal skin rigidly bonded to and around said laminated metal foil core, the longitudinal axes of all of said linear corrugations of said corrugated sheets being vertically and angularly disposed relative to the chordal plane of said rotor blade.

5. The rotor blade of claim 4 wherein the linear corrugations of adjacent sheets cross each other at an acute angle.

6. The rotor blade as defined in claim 4 wherein the parallel planes of said flat metal foil sheets are normal to and angularly disposed relative to the chordal plane of said rotor blade.

7. The rotor blade as defined in claim 4 wherein the parallel planes of said flat metal foil sheets extend substantially chordwise of the rotor blade.

8. The rotor blade as defined in claim 4 wherein the parallel planes of said corrugated flat metal foil sheets extend parallel to the spanwise axis of the rotor blade.

9. The rotor blade as defined in claim 4 wherein the corrugations of each metal foil sheet form alternately oppositely-facing venting channels throughout their linear extent.

10. The rotor blade as defined in claim 9, wherein vent means is provided in said outer end, spanwise venting channel means formed in the periphery of said core and communicating with said first-mentioned venting channels and said vent means, whereby the entire blade is subject to venting at said end thereof.

11. The rotor blade as defined in claim 4 wherein the thickness of the metal foil of the corrugated sheets is between .001 to .006 of an inch.

12. A method of constructing a lightweight core unit of the truss-grid type which comprises the steps of corrugating a strip of foil material so as to provide a ridge-like bonding area at the crest of the corrugation, coating the ridge-like bonding areas only of the corrugations with an adhesive, slitting the corrugated material at an angle of substantially 45° to the corrugations, leaving the crests on one side intact, folding the strip on the intact crests so that crests cross at substantially 90° and bonding the crossed crests.

13. A method of constructing a lightweight core unit of the truss-grid type which comprises the steps of corrugating a strip of foil material so as to provide a ridgelike bonding area at the crest of each corrugation, coating the ridgelike bonding areas only of the corrugations with an adhesive on one side of the strip, slitting the corrugations on the opposite side of the strip at substantially forty-five degrees, spacing the slits corresponding to the width of the strip and leaving the crests on the one side intact, folding the strip on the intact crest at each consecutive slit so that the crests cross each other at substantially ninety degrees with an edge of each fold substantially contacting the edge of the adjacent fold, and bonding the crossed crests.

14. The rotor blade of claim 4 wherein the corrugations of all of said corrugated metal foil sheets are substantially the same size and thickness throughout, the corrugations of said metal foil sheets all having flat outer ridge bonding areas, their planar sides being slightly outwardly inclined from said flat ridge bonding areas to provide lateral rigidity, said linear corrugations of adjacent sheets crossing each other at an acute angle.

15. A laminated lightweight core structure having a leading edge and shaped to conform to an airfoil throughout a major portion thereof, said laminated core comprising a plurality of parallel linearly corrugated flat sheets of metal foil adhesively bonded together at all contacting surfaces in face-to-face relation, the corrugations of alternate sheets being angularly inclined and opposed to cross those of adequate sheets, whereby said crossed corrugations form rigid truss-like structures, said parallel planes of said linearly corrugated flat sheets intersecting and being angularly disposed relative to the chordal plane of said airfoil core structure, the longitudinal axes of the linear corrugations of said plurality of flat sheets being disposed obliquely to said leading edge and inclined upwardly and forwardly toward said leading edge.

16. A laminated lightweight airfoil, comprising an outer skin having an airfoil shape, metal foil core means disposed within said airfoil and extending to the inner surface of said outer skin of said airfoil throughout a major portion thereof, said core means being comprised of a plurality of linearly corrugated flat sheets of metal foil, said metal foil core being adhesively bonded together at all contacting surfaces in face-to-face relation, the corrugations of alternate sheets being angularly inclined and opposed to cross those of adjacent sheets whereby said crossed corrugations form rigid truss-like structures, the longitudinal axes of all the linear corrugations of said plurality of flat sheets being inclined at an acute angle to the leading edge of said airfoil.

17. A laminated lightweight airfoil construction comprising an outer skin member, a core means disposed within said hollow skin member, said core means filling a major portion of the airfoil section and being comprised of a plurality of linearly corrugated flat sheets of metal foil extending to the outer skin member on at least one side of the chord axis of said airfoil and adhesively bonded together at all contacting surfaces in face-to-face relation, the corrugations of alternate sheets being angularly inclined and opposed to cross those of adjacent sheets whereby said crossed corrugations form rigid truss-like structures, the longitudinal axes of all the linear corrugations of said plurality of flat sheets being inclined upwardly and forwardly at an acute angle to the leading edge of said airfoil.

References Cited in the file of this patent

UNITED STATES PATENTS

| | | |
|---|---|---|
| 520,366 | Leaver | May 22, 1894 |
| 1,100,064 | Ferres | June 16, 1914 |
| 1,915,626 | Spohn | June 27, 1933 |
| 1,955,833 | Romanoff | Apr. 24, 1934 |

FOREIGN PATENTS

| | | |
|---|---|---|
| 720,956 | Great Britain | Dec. 29, 1954 |
| 630,396 | Great Britain | Oct. 12, 1949 |
| 450,524 | Great Britain | Apr. 23, 1935 |
| 446,356 | Canada | Jan. 27, 1948 |

OTHER REFERENCES

"Honeycomb Sandwich Design" 1959 (Brochure E) (Hexcel Products Inc.; 2332 4th St., Berkeley 10, California).